United States Patent
Feldman et al.

[11] Patent Number: 6,144,563
[45] Date of Patent: Nov. 7, 2000

[54] PROTECTION CARD FOR IC CARD SLOT

[75] Inventors: Steven Feldman, Madison, Ohio; Charles E. Connoley, Round Rock, Tex.; Michael Bashkin, Solon, Ohio; Philip Lindsay Powell, Austin, Tex.

[73] Assignee: 3M Innovative Properties Company, St. Paul, Minn.

[21] Appl. No.: 08/878,988

[22] Filed: Jun. 19, 1997

[51] Int. Cl.[7] .............................. H02B 1/01; H05K 7/14
[52] U.S. Cl. ...................... 361/829; 361/737; 361/752; 206/706; 439/148
[58] Field of Search .................................... 361/683, 686, 361/737, 756, 796, 799, 807, 829; 206/706, 719; 211/41.17; 174/51, 50; 439/76.1, 92, 131, 135, 136, 149, 148

[56] References Cited

U.S. PATENT DOCUMENTS

| | | |
|---|---|---|
| 5,017,767 | 5/1991 | Mizuno . |
| 5,277,596 | 1/1994 | Dixon . |
| 5,397,857 | 3/1995 | Farquhar et al. . |
| 5,414,253 | 5/1995 | Baudouin et al. . |
| 5,475,919 | 12/1995 | Wu et al. .................................. 29/841 |
| 5,490,891 | 2/1996 | Farquhar et al. . |
| 5,504,994 | 4/1996 | Banakis et al. . |
| 5,510,959 | 4/1996 | Derstine et al. . |
| 5,521,369 | 5/1996 | Kumar .................................. 235/472 |
| 5,531,328 | 7/1996 | Rochelo et al. ......................... 206/706 |
| 5,546,278 | 8/1996 | Bethurum . |
| 5,547,397 | 8/1996 | Hirai . |
| 5,548,483 | 8/1996 | Feldman . |
| 5,548,484 | 8/1996 | Kantner . |
| 5,548,485 | 8/1996 | Bethurum et al. . |
| 5,554,821 | 9/1996 | Patterson et al. ....................... 174/52.2 |
| 5,574,628 | 11/1996 | Persia et al. . |
| 5,575,546 | 11/1996 | Radloff . |
| 5,575,663 | 11/1996 | Broschard, III et al. . |
| 5,584,706 | 12/1996 | Hung . |
| 5,613,860 | 3/1997 | Banakis et al. . |
| 5,712,766 | 1/1998 | Feldman ................................... 361/737 |

FOREIGN PATENT DOCUMENTS

| | | |
|---|---|---|
| 0 532 166 A1 | 7/1992 | European Pat. Off. ...... H01R 13/648 |
| 710 059 A2 | 10/1995 | European Pat. Off. . |
| 0697806 A1 | 2/1996 | European Pat. Off. . |
| 5-201183 | 8/1993 | Japan . |
| 5-201184 | 8/1993 | Japan . |
| 2 306 789 | 5/1997 | United Kingdom ............. H05K 5/00 |

*Primary Examiner*—Jayprakash N. Gandhi
*Attorney, Agent, or Firm*—Matthew B. McNutt

[57] ABSTRACT

A host electronics device has slot for receiving an IC card. An IC protection or dummy card is provided for insertion into the slot. The card is a one-piece, substantially planar molded body. One end of the body receives a portion of the connector of the device in a manner such that a surface of the body exerts a frictional force on the connector. Portions of the body provide reinforcement for the slot.

25 Claims, 4 Drawing Sheets

PROTECTION CARD FOR IC CARD SLOT

BACKGROUND OF THE INVENTION

The disclosures herein relate generally to IC card assemblies and more particularly to a protection or dummy card used to fill an empty IC card slot.

Electronic devices which incorporate slots for IC cards such as PCMCIA Cards, Compact Flash Cards and other electronic card structures, may be stored, shipped or used without the card being installed in the slot. However, when such slots are empty, there is a risk of ingress of debris or foreign object damage to the host connector within the slot, or any internal components which would otherwise be protected if the card were installed in the slot. Also, when the card slot is empty, the host device loses physical integrity due to the unsupported space within the empty slot. Internal components of the host device, including pins of the host connector may also be subjected to atmospheric corrosion when not protected or covered.

The above-mentioned damage may occur at anytime there is no card in the slot, including periods of non-use and periods prior to use such as when the host device is being shipped. The functional cards used in the slots are relatively expensive and are available with a variety of options, so that the end user may prefer to select the type of functional card or cards to be used with the host device. Therefore, it may not always be possible to ship the host device with the installed functional card. An additional problem which may occur when there is no card in the slot is the loss of shielding against electromagnetic interference.

Therefore, what is needed is an IC protection card which can be inserted into an IC card slot in a host device and the functional card is removed, or when the device is being shipped without a functional card mounted therein, for limiting the ingress or debris or foreign object to the host connector or internal components, for maintaining the physical integrity of the slot within the host device, for limiting atmospheric corrosion to the host connector pins, for shielding the host against electromagnetic interference and which can be provided relatively inexpensively.

SUMMARY

One embodiment, accordingly, provides an apparatus for insertion into the IC card slot of a host electronics device when a functional card is not in use within the slot or when the host device is to be shipped without a functional card. To this end, an IC protection card is provided for insertion into an IC card slot of a host electronics device. The host device has a connector mounted therein. The protection card comprises a one-piece, substantially planar molded body having a peripheral portion provided for receiving a portion of the connector, and including a surface for exerting a frictional force on the connector. Reinforcing portions of the card engage portions of the slot.

A principal advantage of this embodiment is that the protection card enables using at least some of the host connector pins, or a compliance device, or both, to retain the card in the slot, allows for electrical, i.e. grounding connection between the card and host, and protects the host against foreign debris, atmospheric corrosion and mechanical damage. The card need not be keyed for a one-way fit into the slot although such keying is possible if desired.

DETAILED DESCRIPTION OF THE PREFERRED EMBODIMENT

Figure 1:
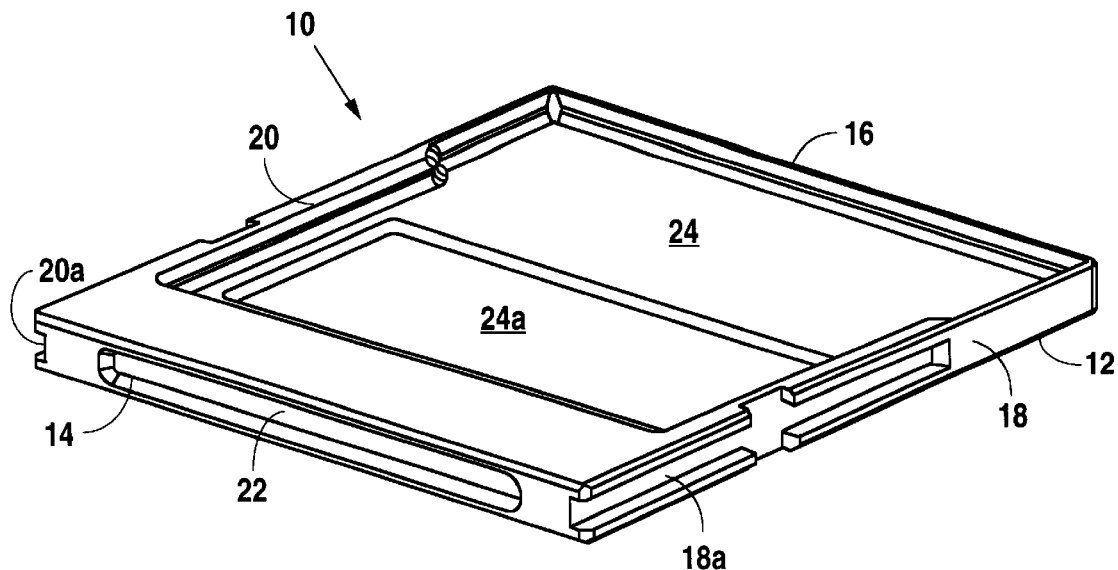
FIG. 1 is an isometric view illustrating an embodiment of a protection IC card.

Referring now to the drawings, an IC protection card is generally designated 10 and comprises a one-piece molded body 12 which is substantially planar and rectangular. The card 10 of FIG. 1 includes a first end 14, a second end 16 and a pair of opposed sides 18, 20. End 16 and sides 18, 20 are in the form of ribs of an increased thickness for reinforcing the card 10. Also, end 14 includes a pin entry opening 22 formed therein. A pair of keyways 18a and 20a in sides 18, 20, respectively, may be either polarized or non-polarized as desired for permitting multiple or one-way insertion into an associated electronics device (to be discussed later). An interior web 24, of reduced thickness relative to the ends 14, 16 and sides 18, 20 discussed above, interconnects those ends and sides. A through hole 24a may be formed in web 24 to reduce weight and as an indicator that card 10 is a non-functional card.

Figure 2:
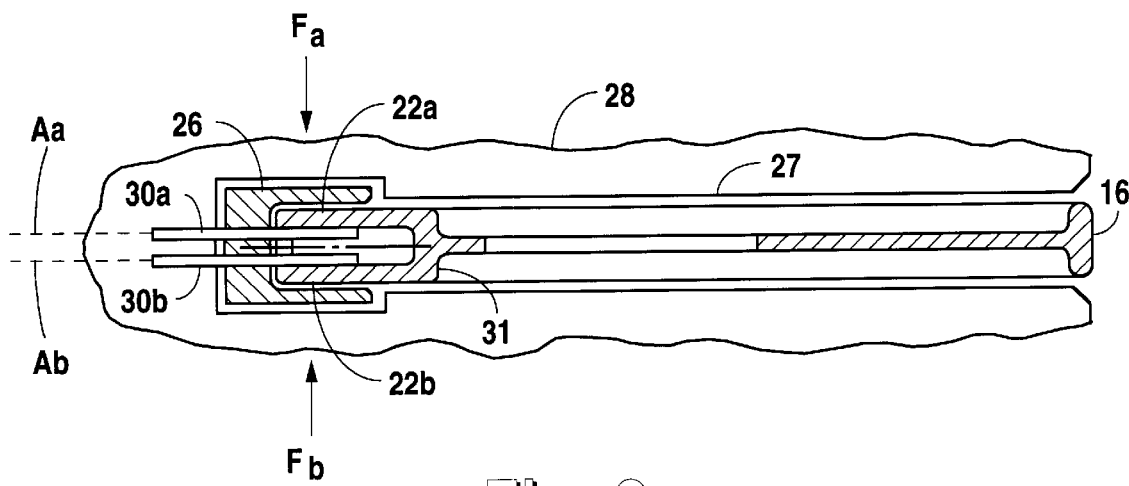
FIG. 2 is a cross-sectional side view illustrating an embodiment of a protection card in frictional engagement with pins of a host device.

In FIG. 2, card 10 is inserted into a connector 26 in a slot 27 of a host electronics device partially shown at 28, such as a palmtop computer. A plurality of pins of device 28 are disposed in a first row 30a and a second parallel row 30b. It should be understood that device 28 may also include a single pin or a single row of pins. Pins of row 30a and pins of row 30b are subjected to a flexure force due to a friction or interference fit with an upper planar plate 22a and a lower plate planar 22b, respectively, of pin entry opening 22. As viewed in FIG. 2, a flexure force designated Fa is exerted on pin row 30a by upper plate 22a and a flexure force designated Fb is exerted on pin row 30b by lower plate 22b. The forces Fa, Fb act substantially transverse or normal to the longitudinal axes Aa, Ab of pins in rows 30a, 30b respectively. In essence, opposed surfaces of upper and lower plates 22a, 22b, pinch pin rows 30a, 30b toward each other due to the above-mentioned friction fit. It should also be noted in FIG. 2, that second end 16 of card 10 can be used as a grasping lip for removing card 10 from slot 27.

Figure 3:
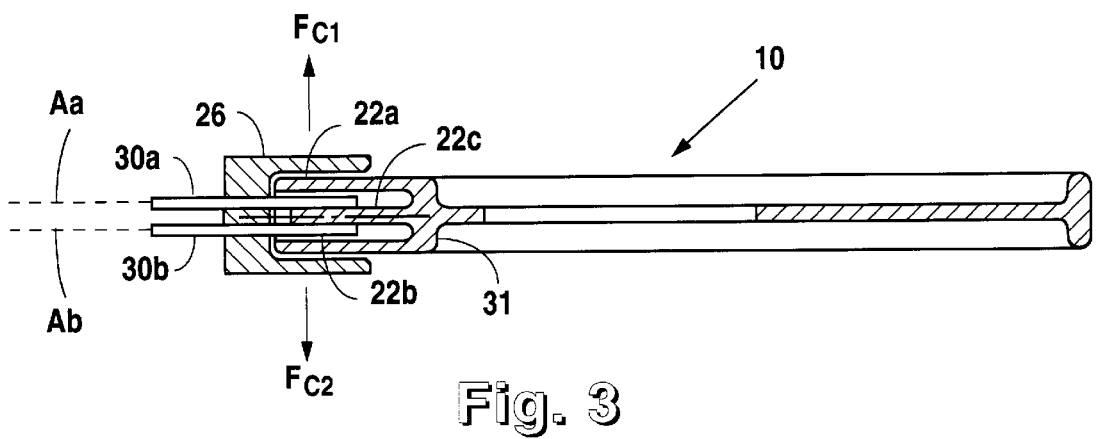
FIG. 3 is a cross-sectional side view illustrating another embodiment of a protection card in frictional engagement with pins of a host device.

In another embodiment, illustrated in FIG. 3, pins of row 30a and pins of row 30b are subjected to a flexure force due to a friction or interference fit with a planar mid-plate 22c disposed between plates 22a, 22b. As viewed in FIG. 3, a pair of opposed flexure forces designated Fc1, Fc2 are simultaneously exerted on pin rows 30a and 30b, respectively, by mid-plate 22c. The forces Fc1, Fc2 act substantially transverse or normal to the longitudinal axes Aa, Ab of pins in rows 30a, 30b, respectively. In essence, opposed surfaces of mid-plate 22c wedge between and spread pin rows 30a, 30b away from each other due to the abovementioned friction fit. In addition, an end wall 31 interconnects upper and lower plates 22a, 22b with web 24 in FIG. 2 and interconnects plates 22a, 22b and mid-plate 22c with web 24, to form a closed socket for enclosing the pin rows 30a, 30b, and protecting the pins from contamination.

Figure 4:
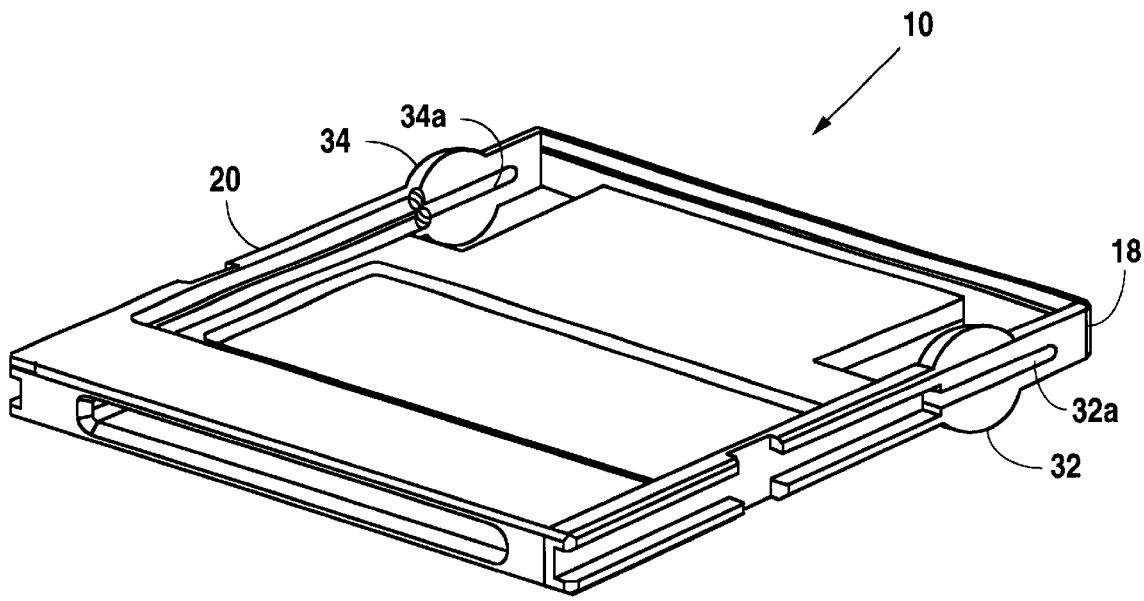
FIG. 4. is an isometric view illustrating an embodiment of a protection card including a compliance device.
Figure 5:
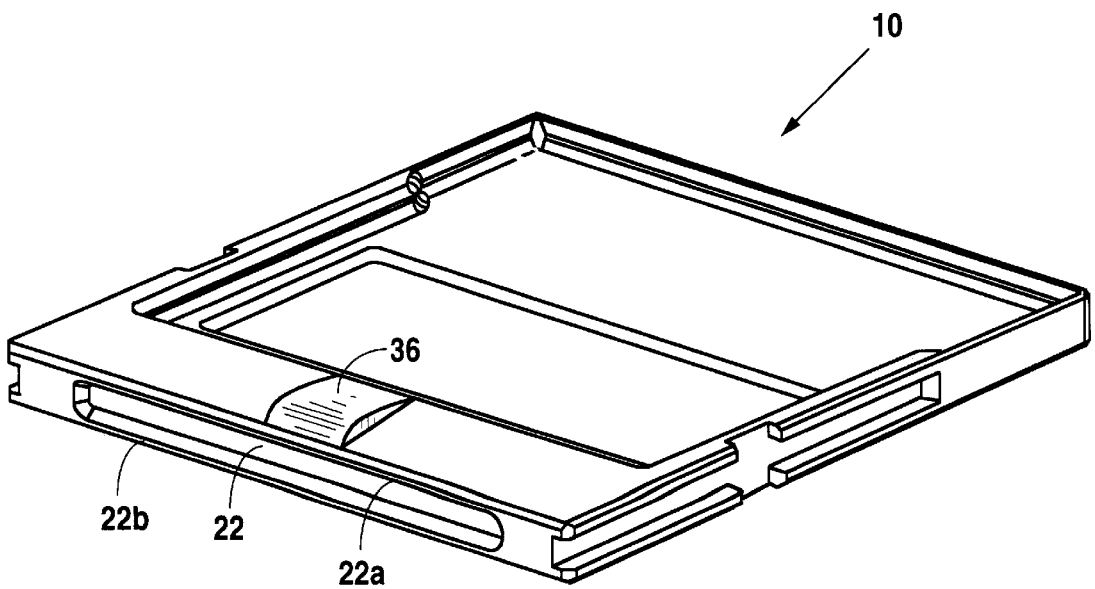
FIG. 5 is an isometric view illustrating another embodiment of a protection card including an alternative compliance device.

Another feature of card 10 is illustrated in FIG. 4 which includes protrusions 32, 34 on opposed sides 18, 20, respectively. The protrusions 32, 34 provide a friction fit with opposed surfaces of slot 27, FIG. 2, rather than with the connector 26, to assist in retaining card 10 in slot 27. Cutouts 32a, 34a, in sides 18, 20, respectively, provide for flexure of sides 18, 20 due frictional engagement of protrusions 32, 34 in slot 27. A variance to protrusions 32, 34 is the provision of a friction fit bump or protrusion 36, FIG. 5, on upper plate 22a for engaging connector 26. Opening 22 between upper plate 22a and lower plate 22b, provides for flexure of plate 22a due to frictional engagement of bump 36 in connector 26.

Figure 6:
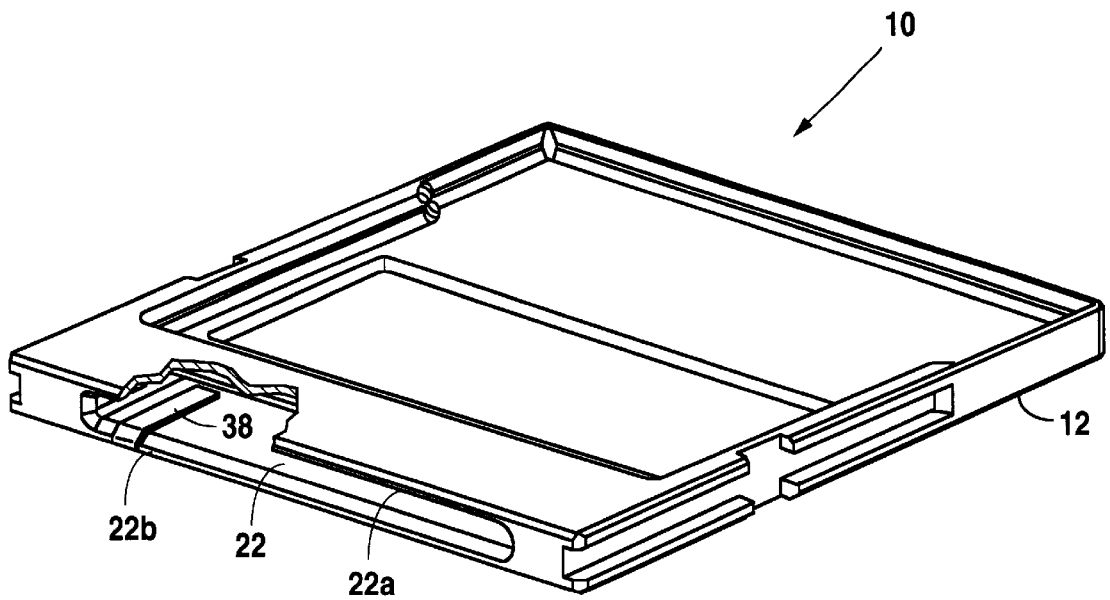
FIG. 6 is an isometric view illustrating an embodiment of a protection card including a metalized strip for grounding contact.

Grounding of some pins in pin rows 30a, 30b may be desirable. This may be accomplished as illustrated in FIG. 6, wherein a metal trace 38 is provided on plate 22b. Body 12 is preferably metalized by conventional methods as a means to satisfy electrical shielding requirements. Portions of plates 22a, 22b contacting other pins of pin rows 30a, 30b can be formed of non-conductive material such as the base material of body 12 including a plastic or a ceramic material.

Figure 7:
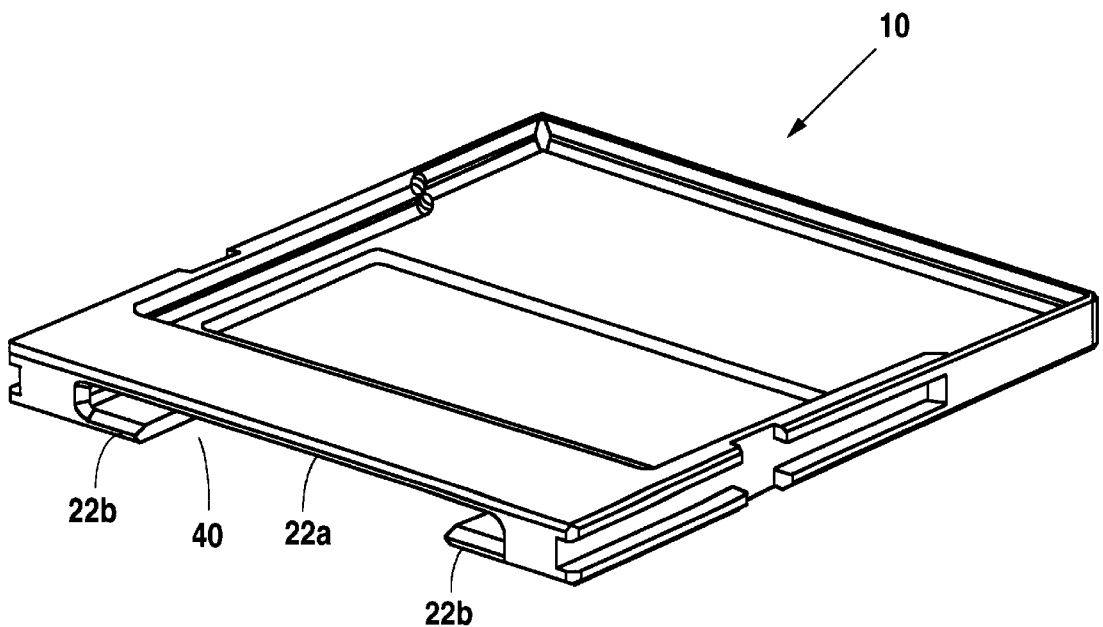
FIG. 7 is an isometric view illustrating another embodiment of a protection card including a metalized body for grounding contact.

A further possible configuration for opening 22 is illustrated in FIG. 7 wherein lower plate 22b has an open portion 40 formed therein. However, remaining portions of plate 22b are sufficient for engagement with some pins of row 30b and plate 22a engages pins of row 30a. Also, as discussed above, portions of plates 22a, 22b may be conductive for grounding of selected pins and other portions of plates 22a, 22b may be non-conductive.

Figure 8:
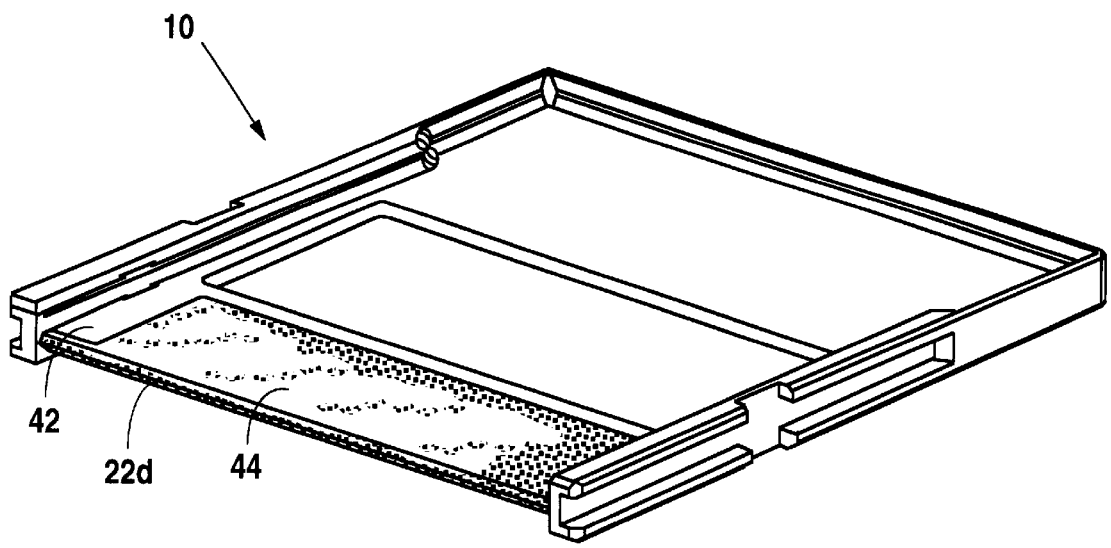
FIG. 8 is an isometric view illustrating another embodiment of a protection card.
Figure 9:
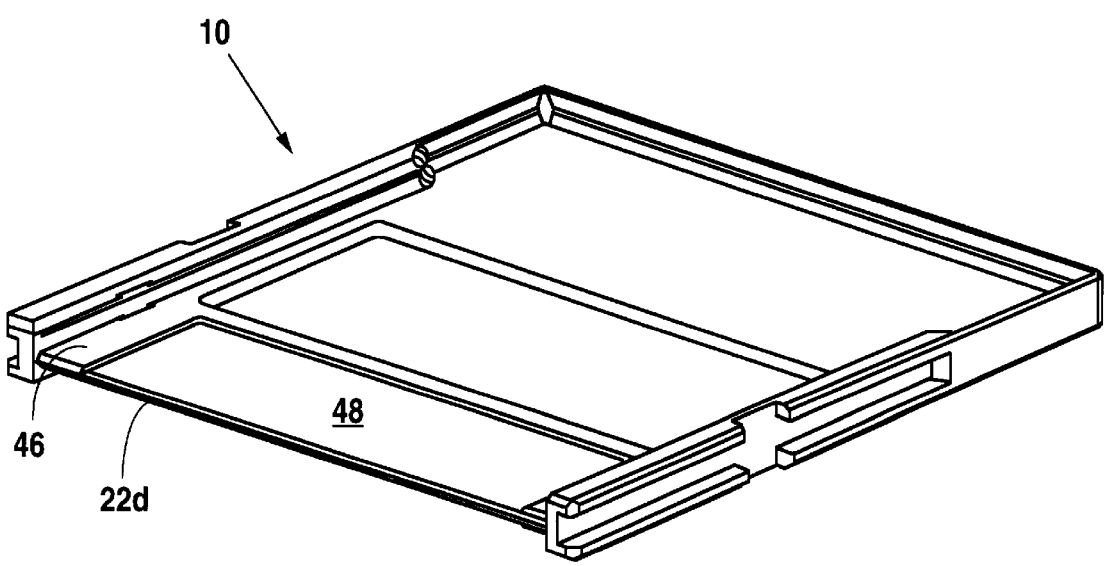
FIG. 9 is an isometric view illustrating a further embodiment of a protection card.

The embodiments of FIGS. 8 and 9 include a single planar plate 22d which wedges between pin rows 30a, 30b similar to plate 22c described above. However, in this embodiment there are no upper and lower plates or end wall to form the closed socket to surround the pin rows as previously discussed. In FIG. 8, plate 22d includes a metalized pad 42 for grounding selected ones of the pins and a non-conducting surface 44 for engaging the non-grounded pins. In FIG. 9, plate 22d includes a raised or increased thickness pad 46 which may include a conductive portion for grounding selected ones of the pins. However, rather than a non-conducting surface, a portion 48 of plate 22d is relieved or reduced in thickness so as to remain out of contact with pins of pin rows 30a, 30b. Portion 48 can also be cut-out of plate 22d and thus be completely eliminated.

As it can be seen, the principal advantages of these embodiments are that the protection card provides an apparatus for insertion into an empty IC card slot of a host electronics device. Protection card retention in the IC card slot is accomplished by providing a light press-fit between the connector portion of the protection card and the connector portion of the host equipment. The protection card body which is preferably plastic or some other dielectric material and can be metalized or filled to provide desired electrical properties, including for example, but not limited to shielding or static dissipation.

The protection card provides damage protection for the host at a very low added cost. The protection card is a one-piece molded part thus reducing component costs and eliminating assembly steps associated with functional cards. The protection card avoids confusion among users by providing key visual and tactile differences such as a large body recess in place of flat covers, an opening formed completely through the body, and a wide socket opening rather than discrete contact apertures. Each of these features renders this protection card distinct from a functional card.

The protection card may have, but does not require, polarization since there are no circuitry considerations. Therefore, the standardized mechanical keying and ejector scheme can be altered, allowing the card to be installed right-side-up or upside-down. This feature provides cost savings to the manufacturer of the host device by eliminating the usual card orientation step during factory installation. To permit installation without orientation, the bottom grasping rib has been eliminated in addition to removing the polarization elements. In place of the bottom grasping rib, upper and lower lip portions of the back wall of the card are used for grasping since they provide identical functionality.

Although illustrative embodiments have been shown and described, a wide range of modifications, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. An IC protection card for insertion into an IC card slot of a host electronics device having a connector mounted therein, the card comprising:

a one-piece, substantially planar molded body;

means at a peripheral portion of the body for receiving a portion of the connector of the device, said means including a planar surface exerting a frictional force on the connector; and reinforcing means on the body provided for engaging portions of the slot.

2. The protection card as defined in claim 1 wherein the means for receiving includes opposed planar surfaces spaced apart by an opening therebetween, the opposed planar surfaces provided for engaging at least some pins extending from the connector, the force being in a direction transverse to the longitudinal axis of the pins.

3. The protection card as defined in claim 1 wherein the means for receiving includes a planar surface provided for wedging between at least some pins extending from the connector, the force being in a direction transverse to the longitudinal axis of the pins.

4. The protection card as defined in claim 3 wherein the surface is partially formed of conductive material and partially formed of non-conductive material.

5. The protection card as defined in claim 3 wherein the surface includes a recessed portion.

6. The protection card as defined in claim 3 wherein the surface includes a cutaway portion.

7. The protection card as defined in claim 1 wherein the means for receiving includes a compliant member on the body provided for engaging the connector.

8. The protection card as defined in claim 1 wherein the means for receiving includes means for enclosing pins extending from the connector.

9. The protection card as defined in claim 1 wherein the means for receiving includes a compliant member on the body provided for engagement with the device.

10. The protection card as defined in claim 1 wherein the body includes peripheral rib members interconnected by a planar web member.

11. The protection card as defined in claim 10 wherein the web member includes an opening formed therethrough.

12. The protection card as defined in claim 1 wherein the means for receiving includes means for grounding the card.

13. The protection card as defined in claim 1 wherein the body is provided for insertion into the slot in more than one orientation.

14. A host electronics device having an IC card slot formed therein comprising:

a connector in the slot, the connector having pins extending therefrom;

an IC protection card in the slot, the card including a one-piece substantially planar molded body; and means at one end of the body for receiving a portion of the connector of the device, said means including at least one planar surface exerting a frictional force on the connector.

15. The protection card as defined in claim 14 wherein the means for receiving includes a pair of opposed planar surfaces spaced apart by an opening therebetween, the opposed planar surfaces provided for engaging at least some of the pins, the force being in a direction transverse to the longitudinal axis of the pins.

16. The protection card as defined in claim 14 wherein the means for receiving includes a planar surface provided for wedging between at least some of the pins, the force being in a direction transverse to the longitudinal axis of the pins.

17. The protection card as defined in claim 16 wherein the planar surface is partially formed of conductive material and partially formed of non-conductive material.

18. The protection card as defined in claim 16 wherein the planar surface includes a recessed portion.

19. The protection card as defined in claim 14 wherein the means for receiving includes a compliant member on the body provided for engaging the connector.

20. The protection card as defined in claim 14 wherein the means for receiving includes a closed socket provided for enclosing the pins.

21. The protection card as defined in claim 20 wherein the means for receiving includes a compliant member on the body provided for engagement with the device.

22. The protection card as defined in claim 14 wherein the body includes peripheral rib members interconnected by a planar web member.

23. The protection card as defined in claim 22 wherein the web member includes an opening formed therethrough.

24. The protection card as defined in claim 14 wherein the means for receiving includes means for grounding the card.

25. The protection card as defined in claim 14 wherein the body is provided for insertion into the slot in more than one orientation.

* * * * *